United States Patent [19]

Downey et al.

[11] Patent Number: 4,744,783
[45] Date of Patent: May 17, 1988

[54] FLEXIBLE SHAFT COUPLING

[75] Inventors: Holmes A. Downey, Simpsonville; Steven C. Marsh, Greenville, both of S.C.

[73] Assignee: Reliance Electric Company, Greenville, S.C.

[21] Appl. No.: 928,261

[22] Filed: Nov. 6, 1986

[51] Int. Cl.[4] .............................................. F16D 3/78
[52] U.S. Cl. ...................................... 464/99; 464/147
[58] Field of Search ..................... 464/69, 98, 99, 147, 464/137

[56] References Cited

U.S. PATENT DOCUMENTS

| Re. 15,672 | 8/1923  | Thomas        | 464/94    |
| ---------- | ------- | ------------- | --------- |
| 1,326,993  | 1/1920  | Thomas        | 464/99    |
| 1,387,532  | 8/1921  | Dexter        | 464/99    |
| 1,454,087  | 5/1923  | Thomas        | 464/99    |
| 2,182,711  | 12/1939 | Thomas        | 464/99    |
| 2,435,058  | 1/1948  | Thomas        | 464/99    |
| 2,499,093  | 2/1950  | Fast          | 464/94    |
| 2,593,877  | 4/1952  | Hagenlocher   | 464/95    |
| 2,639,595  | 5/1953  | Werner        | 464/99    |
| 2,712,741  | 7/1955  | Roller        | 464/95    |
| 2,745,267  | 5/1956  | Hagenlocher   | 464/99 X  |
| 2,877,633  | 3/1959  | Hagenlocher   | 464/98    |
| 3,004,409  | 10/1961 | Grey          | 464/69    |
| 3,266,270  | 8/1966  | Yutkowitz     | 464/99    |
| 3,494,147  | 2/1970  | Goody         | 464/69    |
| 3,500,658  | 3/1970  | Goody         | 464/99    |
| 3,654,775  | 4/1972  | Williams      | 464/99 X  |
| 3,703,817  | 11/1972 | Orwin         | 464/99    |
| 4,055,966  | 11/1977 | Fredericks    | 464/99    |
| 4,187,940  | 2/1980  | Ratliff et al.| 464/98 X  |
| 4,353,704  | 10/1982 | Corey         | 464/137 X |
| 4,416,645  | 11/1983 | Fredericks    | 464/99    |
| 4,482,335  | 11/1984 | Goody         | 464/99 X  |

FOREIGN PATENT DOCUMENTS

| 0037359  | 7/1981  | European Pat. Off. ........... 464/99 |
| 2117590  | 11/1971 | Fed. Rep. of Germany ........ 464/69  |
| 53-92071 | 8/1978  | Japan .................................... 464/98 |

OTHER PUBLICATIONS

Engineering Materials and Design, vol. 22, No. 4, Apr. 1978, "Design Evaluation", (7 pages).
Allen Couplings, Inc., sales literature (8 pages).
Dana Industrial Power Transmission Division, sales literature (14 pages).
Flexibox, Inc., sales literature (2 pages).
Flexibox German sales literature (1 page).
GIB Precission Ltd. sales literature (14 pages).
Koppers Engineered Products sales literature (3 pages).
Mayr sales literature (13 pages).
Metastream sales literature (2 pages).
Thyssen Henschel sales literature (32 pages).
Zurn (Ameridisc) sales literature (10 pages).

Primary Examiner—Daniel P. Stodola
Attorney, Agent, or Firm—Dority & Manning

[57] ABSTRACT

A flexible coupling for connecting a driving shaft and a driven shaft together in an end-to-end relationship for transmitting power from the driving shaft to the driven shaft. Flexible coupling sub-assemblies which are balanced and aligned are provided between a center spacer member and coupling hubs attached to the driving shaft and to the driven shaft. The flexible coupling sub-assemblies each include a pair of annular adaptor rings having therebetween a flexible element member which preferably includes a plurality of side-by-side flexible members. The adaptor rings include an annular flange having on one side thereof a substantially radially extending countersunk face and on the other side thereof a substantially radially extending, generally planar face. The countersunk guide face guides the adaptor rings onto annular flanges of the coupling hubs and center spacer member to ensure proper alignment and balancing of the flexible coupling upon provision thereof with flexible elements. An elongated, cylindrical extension portion is provided on a coupling hub for each flexible coupling sub-assembly and extends through at least one adaptor plate, the flexing member, and at least into the bore of the second adaptor plate. The elongated, substantially cylindrical extension portions retain the flexible coupling sub-assemblies in the event of a failure of the flexible element member to prevent disassociation of a part of the coupling therefrom.

25 Claims, 2 Drawing Sheets

FLEXIBLE SHAFT COUPLING

BACKGROUND OF THE INVENTION

This invention relates to a flexible coupling assembly, which utilizes flexible disc pack elements, for connecting a driving shaft to a driven shaft. A center spacer member is provided which is retained between the shafts in the event of failure of one or more of the flexible disc pack elements.

Where a driving shaft is to be connected to a driven shaft in an end-to-end relationship for transmitting torque from the driving shaft to the driven shaft, a problem of aligning the shafts arises. While, ideally, the shafts should be in perfect alignment, such a condition is difficult to obtain initially and even more difficult to maintain during continued commercial operation. Limited misalignment between two shafts may, however, be accommodated by conventional metal flexible couplings, which routinely employ a hub attached to each shaft, a center spacer member attached between the hubs, and one or more thin metal discs (often fastened together to form a laminated disc pack element) as the portion of the flexible coupling which actually flexes. The discs or disc-pack element are attached between the center member and the hubs and flex to accommodate end float and parallel and/or angular misalignment of the connected shafts. The amount of misalignment manageable by such a flexible coupling is normally limited to several degrees, due to the construction of the coupling and the metallic composition of the flexible element.

The metallic construction of metal flexible couplings normally imparts durability and a long service life, both due to the intrinsic strength of the metallic components and the resistance to corrosion, heat, or other normally encountered conditions or forces which are often detrimental to couplings having flexible elements of rubber and the like.

Problems, however, are also present with above described prior art flexible couplings which utilize flexible disc-pack elements. For example, the disc-pack elements may fail. Such failure of the disc pack element removes the normal holding forces and may thus permit the center spacer member to become broken away from its connection to the flexible coupling with a large amount of kinetic energy. In such a situation, the center spacer member becomes a projectile which could potentially injure personnel and/or damage equipment in the vicinity of the flexible coupling. Flexible couplings are presently available which include hubs that have a portion for insertion into the bore of center spacer member for retaining the center spacer member at the flexible coupling in the event of a disc-pack element failure. Such flexible couplings generally require complex, exacting assembly by a skilled laborer.

Another type of prior art flexible coupling includes a center spacer member assembly which has the flexible disc-pack elements, the center spacer member, and mounting flanges therefor assembled as a unit for attachment between the hub on the driving shaft and the hub on the driven shaft. Because of the integral construction of such a center spacer member assembly, in the event of failure of one of the disc-pack elements, the entire center spacer member assembly must be removed and returned to the manufacturer or to a service center for repair. Another disadvantage of a flexible coupling including an integral center spacer assembly is that the distance between the centers of the two disc-pack elements is typically less than desired, thereby reducing the amount of misalignment that such a flexible coupling having fixed distances between the shafts can accept.

A number of different types of metal flexible couplings are currently available. U.S. Pat. No. 4,055,966, granted to Fredericks, and the Reexamination Certificate number B1 4,055,966 relating thereto, discloses a torque transmission coupling having flexible disc-packs disposed between coupling hubs and a corresponding center spacer member. An alignment pilot ring is fixedly attached on each side of each disc-pack for aligning the hubs with respect to the center spacer member. Bolts passing through a hub, the alignment pilot rings, the flexible disc-pack, and the center spacer member are used in assembling the flexible coupling. U.S. Pat. No. 3,703,817, granted to Orwin, discloses a flexible coupling having two annular, flange-like drive members spaced on either side of a flexible member for attachment between a hub of a driving shaft and a hub of a driven shaft.

Other flexible couplings are disclosed in U.S. Pat. Nos. 2,639,595; 2,712,741; 3,494,147; 3,500,658; 1,454,087; 1,387,532; 2,499,093; 2,745,267; and 4,482,335.

SUMMARY OF THE INVENTION

It is, therefore, one of the objects of the present invention to provide a flexible coupling for coupling and transmitting torque from a driving shaft to a driven shaft which can accommodate parallel and/or angular misalignment or end float between the driving shaft and the driven shaft.

Another object of the present invention is to provide a flexible coupling that may be easily serviced without removing the coupling hubs from the shafts.

Still another object of the present invention is to provide a flexible coupling having a flexible element sub-assembly which can be easily replaced in the field.

Yet another object of the present invention is to provide a flexible coupling having a center spacer member and flexible element sub-assemblies which are retained at the flexible coupling in the event of a failure of a flexible element.

These and other objects are attained by the present invention, which relates to a flexible coupling for connecting a driving shaft and a driven shaft together in and end-to-end relationship for transmitting power from the driving shaft to the driven shaft. The flexible coupling comprises a first coupling hub having an annular flange projecting radially outwardly therefrom. A second coupling hub is included having an annular flange projecting radially outwardly therefrom. A first adaptor ring having an annular body with a central bore therethrough is provided, the first adaptor ring including an annular flange. A substantially radially extending countersunk guide face is defined on one side of the annular flange, and a substantially radiallly extending, generally planar face is defined on an opposite other side thereof. The countersunk guide face receives the annular flange of the first coupling hub in mating relationship therewith. A second adaptor ring having an annular body with a central bore therethrough is provided. The second adaptor ring includes an annular flange. A substantially radially extending countersunk guide face is defined on one side of the annular flange and a substantially radially extending, generally planar second face is defined on an opposite side thereof. The countersunk guide face receives the annular flange of the second coupling hub in mating relationship therewith. Flexible element means are disposed between the first and second adaptor rings for transmitting rotational forces from the driving shaft to the driven shaft, the flexible element means being adjacent both the generally planar face of the annular flange of the first adaptor ring and the generally planar face of the annular flange of the second adaptor ring. Fastening means associated with the first and second coupling hubs, the first and second adaptor rings and the flexible element means are provided for securing the flexible element means between the first and second adaptor rings, the first adaptor ring to the first coupling hub, and the second adaptor ring to the second coupling hub.

In a preferred embodiment of the present invention, the flexible coupling assembly includes a center spacer member disposed between the first and second coupling hubs. A flexible element sub-assembly, which includes two adaptor rings having a flexible element means attached therebetween, is provided between the center spacer member and the first coupling hub and also between the center spacer member and the second coupling hub. An elongated, generally cylindrical extension portion is provided on the first coupling hub and on the second coupling hub. The cylindrical extension portion extends through the flexible element sub-assembly attached to each hub for retaining the center spacer member at the flexible coupling in the event of a failure of a flexible element.

BRIEF DESCRIPTION OF THE DRAWINGS

The foregoing as well as other objects of the present invention will be more apparent from the following detailed description of the preferred embodiment of the invention, when taken together with the accompanying drawings, in which.

DESCRIPTION OF THE PREFERRED EMBODIMENT

Figure 1:
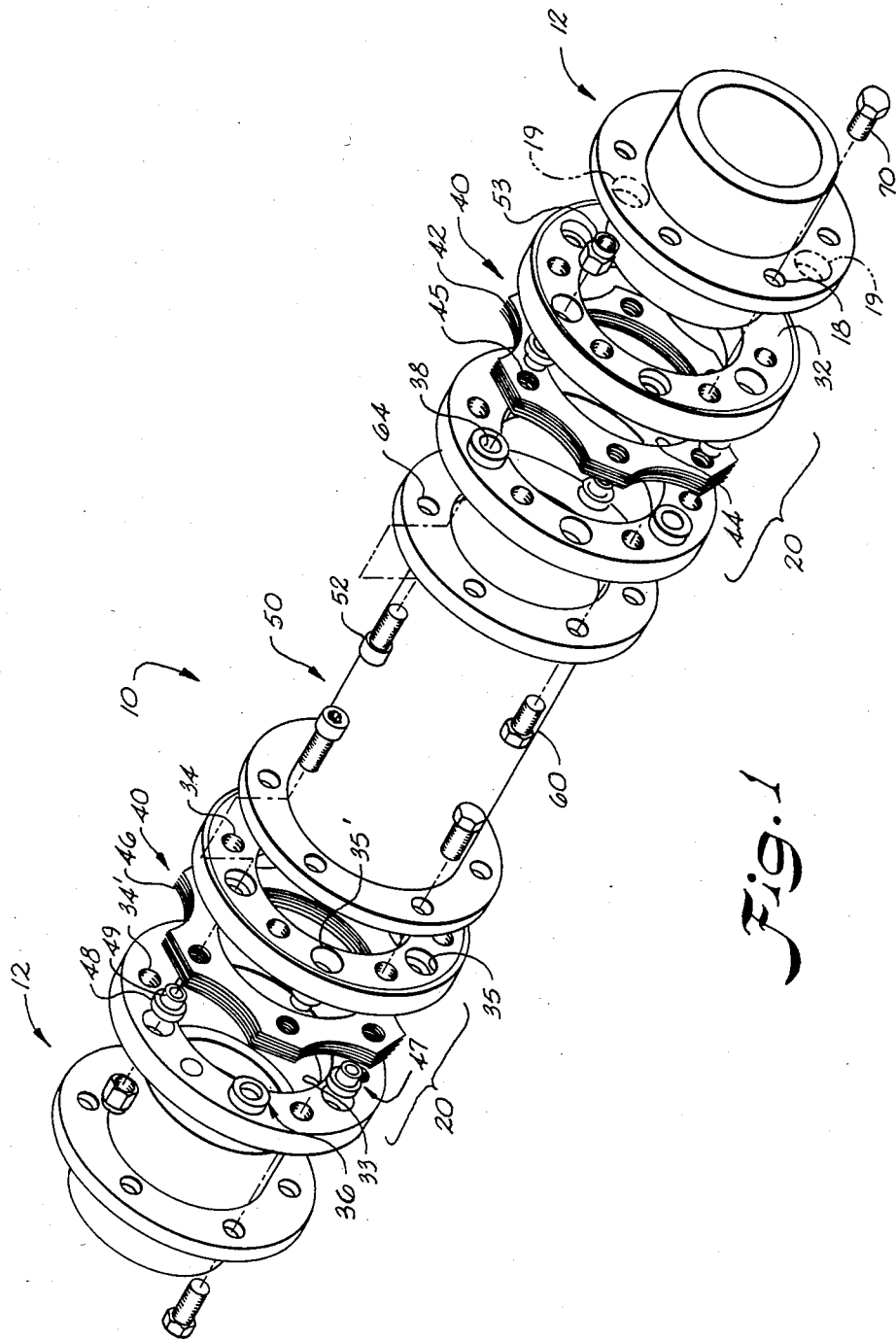
FIG. 1 is an exploded perspective view of a preferred form of a flexible coupling constructed in accordance with the present invention.

Referring to the drawings in detail, wherein like reference characters represent like elements throughout the various views, a flexible coupling of the present invention is designated generally by the reference character 10. As shown in FIG. 1, flexible coupling 10 includes two coupling hubs generally 12, two flexible coupling sub-assemblies generally 20, each having a flexible coupling element generally 40 attached therebetween by flexible element fastening members 50. Also included is a center spacer member 60 disposed between hubs 12, a flexible coupling sub-assembly 20 being attached between center spacer member 60 and hubs 12 by flange attachment fastening members 70.

Figure 3:
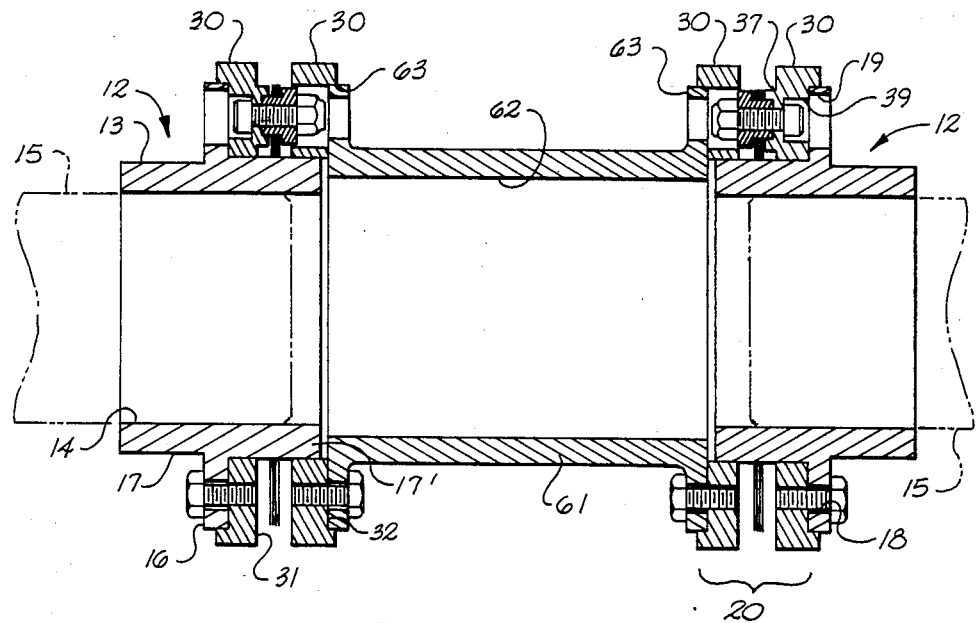
FIG. 3 is a sectional view along line III—III of FIG. 2.
Figure 2:
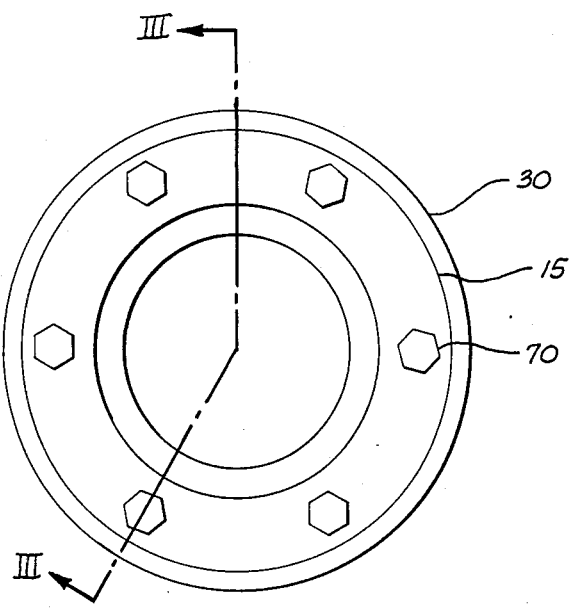
FIG. 2 is an end view of a preferred form of a flexible coupling constructed in accordance with the present invention.

As illustrated in FIGS. 2 and 3, coupling hubs 12 include a generally cylindrical body portion 13 having a central bore 14 for receiving an end of a shaft 15. Coupling hubs 12 are preferably constructed of mild steel, although any other suitable metal, plastic or other material could also be used. Cylindrical body portion 13 includes an annular flange 16 projecting radially outwardly therefrom. Cylindrical body portion 13 includes a cylindrical extension portion 17 disposed on one side of annular flange 16 and an elongated cylindrical extension portion 17' extending from the other side of annular flange 16. Annular flange 16 of coupling hubs 12 includes a plurality of flange attachment openings 18 which extend therethrough substantially parallel to the axis of cylindrical body portion 13. Flange attachment openings 18 of coupling hubs 12 have a generally smooth finish for receipt of flange attachment fastening members 70, which attach coupling hubs 12 to flexible coupling sub-assemblies 20. Flexible element fastening member access openings 19 also have a generally smooth surface finish.

Flexible coupling sub-assemblies 20 include two annular-shaped adaptor rings 30. Adaptor rings are preferably constructed of steel, although any other suitable metal, plastic or other material could also be used. Each adaptor ring 30 has defined on a radially extending surface thereof a substantially planar face 31 and on an opposite radially extending surface thereof a countersunk guide face 32 defined therein. A central bore 33 is provided each adaptor ring 30. Flange attachment openings 34 are defined in adaptor rings 30 alternatingly with flexible element attachment openings 35. Flange attachment openings 34 are provided threads 34' for receiving threaded flange attachment fastening members 70. Bushings 36 are provided alternatingly in flexible element attachment openings 35, with a bushing 36 being provided in every other flexible element attachment opening 35. Bosses 37 extend outwardly away from planar face 31 of adaptor rings 30. Defined in bosses 37 are holes 38 through which flexible element fastening members 50 pass. Opposite from holes 38, cavities 39 are defined in bosses 37 which receive flexible element fastening members 50.

Attached between a pair of adaptor rings 30 of each flexible coupling sub-assembly 20 is a flexible coupling element 40. Each flexible coupling element 40 includes a plurality of thin metallic discs 42 in a side-by-side relationship. Although discs 42 are preferably constructed of stainless steel, any other suitable metal, plastic, or other material could also be used. Each disc 42 has a central bore 44 therethrough. A plurality of substantially equally spaced bores 45 are defined in each of discs 42. Bores 45 correspond to flexible element attachment openings 35 defined in adaptor rings 30. Discs 42 include scalloped or concave outer edges 46 between bores 45. Discs 42 are held in the side-by-side relationship by flexible element bushings 47 which have a generally ring-shaped enlarged end 48 and a generally cylindrical-shaped reduced end 49 extending from enlarged end 48. Enlarged ends 48 of flexible element bushings 47 are received in flexible element attachment openings 35'. Reduced ends 49 of flexible element bushings 47 are received in recesses 38 of countersunk bosses 37, which are provided alternatingly in flexible element attachment openings 35.

Flexible element fastening members 50 are preferably cap screws or bolts having socket heads 52. Nuts 53 threadingly engage bolts 51. A threaded socket head fastener is used due to the relatively compact heads which take up less hub space and have higher strength than a conventionally headed bolt, permitting coupling hubs 12 to have a larger central bore 14. This gives flexible coupling 10 a higher torque rating, allows use of coupling hubs 12 on a greater number of shafts than if bores 14 were smaller, and also substantially reduces the weight of flexible coupling 10, thereby easing the strain on the support bearings (not shown) for shafts 15. In addition, standard socket head fasteners are much less expensive and more convenient to use than the ground body bolts commonly used with other metal flexible couplings, the body bolts having to be ground to the exact size of a corresponding mounting hole. Flexible element fastening members 50 are disposed in flexible element attachment openings 35 of adaptor rings 30 alternatingly with flange attachment fastening members 70 carried in flange attachment openings 34 of adaptor rings 30. Once installed in flexible element attachment openings 35, the outer edge of heads 52 and nuts 53 of flexible element attachment member 50 are disposed beneath the surface of countersunk guide face 32 and generally planar face 31. Such an arrangement allows a flush fit between adaptor rings 30, coupling hubs 12 and center spacer member 60. Flange attachment fastening members 70 are preferably standard threaded bolts, screws, or the like having a driving head 71.

A flexible coupling sub-asesmbly 20 is mounted on annular flange 16 of each hub 12. Disposed between flexible coupling sub-assemblies 20 is a center spacer member 60. Center spacer member 60 is substantially spool-shaped and includes a generally cylindrical body portion 61 having a central bore 62 extending therethrough. An annular flange 63, projecting radially outwardly from cylindrical body 61, is provided each end of center spacer member 60. A plurality of flange attachment openings 64 are defined in annular flange 63 of center spacer member 60.

In assembling flexible coupling sub-assembly 20, flexible coupling element 40 is provided between a pair of adaptor rings 30. Adaptor rings 30 are oriented such that generally planar faces 31 thereof are facing one another with guide countersunk faces 32 facing outwardly. Flexible element bushings 47 are provided in flexible element attachment openings 35' of adaptor rings 30 and pass through bores 45 of flexible coupling element 40 so that reduced ends 49 of flexible element bushings 47 are received in recesses 38 of extension portions 37 of countersunk bosses 37. Such results in flexible element bushings 47 alternatingly being oppositely orientated with respect to one another about flexible coupling element 40 and adaptor rings 30. Flexible element fastening members 50 are inserted through flexible element bushings 47 such that heads 52 thereof are entirely received within cavities 39 of countersunk bosses 37 and so that nuts 53 of flexible element fastening members 50 are disposed in those flexible element attachment openings 35' which are not provided with countersunk bosses 37. Such an arrangement of flexible element fastening members 50 results in flexible element fastening members 50 alternatingly extending in opposite orientation with respect to one another in flexible element openings 35' about adaptor rings 30.

In assembling flexible coupling assembly 10, hubs 12 are attached to shafts 15 by conventional means such as by set scews (not shown) extending through hubs 12 into a slot or key-way (not shown) defined in shafts 15, or through use of a key (not shown) which engages both a keyway (not shown) defined in hubs 12 and a keyway (not shown) defined in shafts 15. Center spacer member 60 is provided between coupling hubs 12. A flexible coupling sub-assembly 20 is provided between center spacer member 60 and each of coupling hubs 12. One countersunk guide face 32 of each flexible coupling sub-assembly 20 engages annular flange 63 of center spacer member 60, and the other countersunk guide face 32 engages annular flange 16 of a coupling hub 12.

Each flexible coupling sub-assembly 20 is preferably a balanced, self-contained flexing unit having countersunk guide faces 32 which are aligned with respect to one another. Such allows for one flexible coupling sub-assembly 20 to be inserted for another without requiring flexible coupling 10 to be re-aligned and balanced again. Accordingly, replacement of a flexible element 40 is simplified as opposed to certain conventional flexible couplings which must be re-aligned and balanced again upon replacement of a flexible element.

Countersunk guide faces 32 of flexible sub-assemblies 20 enhance the simplicity by which a flexible element 40 is renewed. Countersunk guide faces 32 help to ensure that flexible coupling sub-assemblies 20 properly engage annular flanges 16 of coupling hubs 12 and annular flanges 63 of center spacer member 60 for simplifying alignment between coupling hubs 12 and center spacer member 60. Upon placement between center spacer member 60 and coupling hubs 12, flexible coupling sub-assemblies 20 are attached thereto by flange attachment fastening members 70 which engage threaded flange attachment openings 34 and adaptor rings 30.

Elongated cylindrical extension portions 17' extend substantially through flexible coupling sub-assemblies 20 when flexible coupling 10 is assembled. Elongated cylindrical extension portions 17' serve to engage adaptor rings 30 in the event of failure of a flexible element 40 to prevent center spacer member 60 from becoming disengaged from flexible coupling 10, and consequently becoming a potentially dangerous projectile. The capturing of center spacer member 60 by elongated cylindrical extension portions 17' upon failure of the flexible element 40 accordingly provides flexible coupling 10 with an important safety feature.

Flexible element fastening member clearance openings 19 could be provided coupling hubs 12 and center spacer member 60 to allow clearance for flexible element fastening members 50 should flexible element fastening members 50 move or travel above countersunk guide face 32 during operation of flexible coupling 10.

In the event of failure of a flexible element 40, the coupling sub-assembly 20 associated therewith is removed from flexible coupling 10 and replaced with a new or reconditioned flexible coupling sub-assembly 20. Coupling hubs 12 do not have to be removed from shafts 15 for such to be performed. The provision of flexible coupling 10 with a new or reconditioned flexible coupling sub-assembly 20 allows flexible coupling 10 to be quickly renewed for service at a potential reduction in expense because the purchase of a new or reconditioned center spacer member is not required, as is required by certain prior art flexible couplings when replacing a flexible element.

Flexible coupling sub-assemblies 20 can also be used to connect two coupling hubs 12 together directly, without the provision of a center spacer member 60 therebetween. In such an application, countersunk guide faces 32 of flexible coupling sub-assembly 20 would be attached directly to annular flanges 16 of coupling hubs 12. One of coupling hubs 12 could be provided an elongated cylindrical extension portion 17' for extending through flexible coupling sub-assembly 20, for aiding in preventing flexible element 40 from becoming disengaged with flexible coupling sub-assembly 20 in the event of a failure of flexible coupling element 40.

While the preferred embodiment of the invention has been described using specific terms, such descriptions are for illustrative purposes only, and it is to be understood that changes and variations may be made without departing from the spirit or scope of the following claims.

What is claimed:

1. A flexible coupling for connecting a driving shaft and a driven shaft together in an end-to-end relationship for transmitting power from the driving shaft to the driven shaft, the flexible coupling comprising:
   a first coupling hub having an annular flange projecting radially outwardly therefrom;
   a second coupling hub having an annular flange projecting radially outwardly therefrom;
   a first adaptor ring having a central bore therethrough; a substantially radially extending guide face defined on one side of said first adaptor ring and a substantially radially extending, generally planar face defined on an opposite side thereof, said guide face receiving said annular flange of said first coupling hub in mating relationship therewith;
   a second adaptor ring having a central bore therethrough; a substantially radially extending guide face defined on one side of said second adaptor ring and a substantially radially extending, generally planar face defined on an opposite side thereof, said guide face receiving said annular flange of said second coupling hub in mating relationship therewith;
   flexible element means disposed between said first and second adaptor rings for transmitting rotational forces from the driving shaft to the drive shaft, said flexible element means defining a plurality of bores therethrough and being adjacent both said generally planar face of said first adaptor ring and said generally planar face of said second adaptor ring;
   first fastening means for fastening said first coupling hub to said first adaptor ring and said second coupling hub to said second adaptor ring and second fastening means for securing said flexible element means between said first and second adaptor rings; and
   a plurality of countersunk bosses provided in said first and second adaptor rings, each of said countersunk bosses defining a recess for receipt of said second fastening means, said countersunk bosses extending outwardly from said generally planar face of each of said first and second adaptor rings towards said flexible element means.

2. A flexible coupling as defined in claim 1, wherein said flexible element means includes:
   a plurality of thin discs in a side-by-side relationship, each of said plurality of thin discs having a central bore therethrough; and said second fastening means including securing means associated with said flexible element means for retaining said plurality of thin discs in said side-by-side relationship.

3. A flexible coupling as defined in claim 2, wherein said plurality of thin discs define said plurality of bores of said flexible element means, said plurality of bores corresponding to said flexible element attachment holes in said first and second adaptor rings, and wherein said plurality of thin discs have concave outer edges between said bores.

4. A flexible coupling as defined in claim 1, further comprising:
   said annular flange of said first coupling hub defining therein a plurality of flange attachment holes;
   said annular flange of said second coupling hub defining therein a plurality of flange attachment holes;
   said first and second adaptor rings defining therein a plurality of flange attachment holes and a plurality of flexible element attachment holes alternatingly with respect to one another therein, said plurality of flange attachment holes of said first and second adaptor rings corresponding to said plurality of flange attachment holes of said annular flange of said first coupling hub and said annular flange of said second coupling hub;
   said second fastening means including a plurality of flexible element fastening members having transversely extending enlarged portions of one end thereof and being received in said flexible element attachment holes of both of said first and second adaptor rings and said bores of said flexible element means for securing said flexible element means therebetween, said flexible element attachment holes being larger in diameter than the transverse dimension of said enlarged portions of said flexible element fastening member having its enlarged portion at an opposite adaptor ring; and
   said first fastening means including a plurality of flange attachment members disposed in said flange attachment holes of said first coupling hub and said first adaptor ring mounted thereon for securing said first adaptor ring to said first coupling hub, and a plurality of flange attachment members disposed in said flange attachment holes of said second coupling hub and said second adaptor ring mounted thereon for securing said second adaptor ring to said second coupling hub.

5. A flexible coupling as defined in claim 4, wherein said flexible element attachment holes of said first and second adaptor rings are provided a generally uniformly finished bore, wherein each of said plurality of flange attachment members are threaded, and wherein said flange attachment holes of said first and second adaptor rings are threaded for receiving said plurality of flange attachment members.

6. A flexible coupling as defined in claim 4, further comprising:
   said plurality of countersunk bosses being provided alternatingly in said plurality of flexible element attachment holes of said first and second adaptor rings for receipt of said flexible element fastening members, said countersunk bosses allowing said enlarged portions of said flexible element fastening members to be received therein such that an outer edge of said enlarged portions are spaced inwardly from said generally planar faces of said first and second adaptor rings, respectively.

7. A flexible coupling as defined in claim 6, wherein said flexible element means includes:
   a plurality of thin discs in a side-by-side relationship, a plurality of substantially equally spaced bores defined therethrough corresponding to said plurality of flexible element attachment holes of said first and second adaptor rings; and
   said second fastening means including securing means for retaining said plurality of thin discs in said side-by-side relationship, said securing means including a plurality of flexible element bushings, one of which being mounted in each of said bores of said flexible element means, each of said flexible element bushings having an enlarged end and a reduced end.

8. A flexible coupling as defined in claim 7, wherein said recesses defined in each said countersunk boss receive said reduced ends of said flexible element bushings.

9. A flexible coupling as defined in claim 1, further comprising:
an elongated, generally cylindrical extension portion provided on said first coupling hub for extending through both said central bore of said first adaptor ring mounted on said first coupling hub and said flexible element means, said cylindrical extension portion of said first coupling hub extending into said central bore of said second adaptor ring adjacent said flexible element means.

10. A flexible coupling as defined in claim 1, wherein said substantially radially extending guide faces of said first and second adaptor rings each define a countersunk contour.

11. A flexible coupling for connecting a driving shaft and a driven shaft together in an end-to-end relationship for transmitting power from the driving shaft to the driven shaft, the flexible coupling comprising:
a first coupling hub having an annular flange projecting radially outwardly therefrom;
a second coupling hub having an annular flange projecting radially outwardly therefrom;
an elongated center spacer member, said spacer member having an annular flange projecting radially outwardly therefrom of each end of same;
a first adaptor ring and a fourth adaptor ring, each having an annular body with a central bore therethrough, said first and fourth adaptor rings each including on one side thereof a substantially radially extending countersunk guide face and on the other side thereof a substantially radially extending, generally planar face, said countersunk guide face of said first adaptor ring receiving said annular flange of said first coupling hub in generally mating relationship therewith and countersunk guide face of said fourth adaptor ring receiving said annular flange of said second coupling hub in generally mating relationship therewith;
a second adaptor ring and a third adaptor ring, each having an annular body with a central bore therethrough, said second adaptor ring and said third adaptor ring each including on one side thereof a substantially radially extending countersunk guide face and on the other side thereof a substantially radially extending, generally planar face, said countersunk guide face of said second and third adaptor rings receiving said annular flanges of said center spacer member in generally mating relationship therewith;
a first flexible element disposed between said first adaptor ring and said second adaptor ring and a second flexible element disposed between said third adaptor ring and said fourth adaptor ring, said first and second flexible elements each defining a plurality of bores therethrough and each being adjacent said generally planar faces of said respective adaptor rings;
fastening means associated with said first and second coupling hubs, said first, second, third, and fourth adaptor rings, said center spacer member and said first and second flexible elements for securing said first flexible element between said first and second adaptor rings, said second flexible element between said third and fourth adaptor rings, said first adaptor ring to said first coupling hub, said second adaptor ring to said center spacer member, said third adaptor ring to said center spacer member, and said fourth adaptor ring to said second coupling hub, whereby said first and second flexible elements will transmit rotational forces from the driving to the driven shaft while accommodating misalignment therebetween; and
a plurality of countersunk bosses provided in said first, second, third, and fourth adaptor rings, each of said countersunk bosses defining a recess for receipt of said fastening means, said countersunk bosses extending outwardly from said generally planar face of each of said first, second, third and fourth adaptor rings.

12. A flexible coupling as defined in claim 11, wherein said first and second flexible elements each includes a plurality of thin discs in a side-by-side relationship, each of said plurality of thin discs having a central bore therethrough.

13. A flexible coupling as defined in claim 11 wherein said fastening means comprises:
said annular flange of said first coupling hub defining therein a plurality of flange attachment holes; said annular flange of second coupling hub defining therein a plurality of flange attachment holes;
said first and fourth adaptor rings defining therein a plurality of flange attachment holes and a plurality of flexible element attachment holes alternatingly with respect to one another, said plurality of flange attachment holes of said first and fourth adaptor rings corresponding to said plurality of flange attachment holes of said annular flange of said first coupling hub and said annular flange of said second coupling hub;
said second and third adaptor rings defining therein a plurality of flange attachment holes and a plurality of flexible element attachment holes alternatingly with respect to one another;
said annular flanges of said center member defining therein a plurality of flange attachment holes corresponding to said plurality of flange attachment holes of said second adaptor ring and said third adaptor ring;
said fastening means including a plurality of flexible element fastening members having transversely extending enlarged portions at one end of same and being disposed in said flexible element attachment holes of both said first adaptor ring and said second adaptor ring for securing said first flexible element therebetween, said plurality of flexible element fastening members being disposed in said flexible element attachment holes of both said fourth adaptor ring and said third adaptor ring for securing said second flexible element therebetween, said flexible element attachment holes being larger in diameter dimension than the transverse dimension of said enlarged portions of said flexible element fastening members and each adjacent flexible element fastening member having its enlarged portion at an opposite adaptor ring; and
said fastening means including a plurality of flange attachment fastening members disposed in said flange attachment holes of said first coupling hub and said first adaptor ring mounted thereon for securing said first adaptor ring to said first coupling hub, a plurality of flange attachment fastening members disposed in said flange attachment holes of said second coupling hub and said fourth adaptor ring mounted thereon for securing said fourth adaptor ring to said second coupling hub, and a plurality of flange attachment fastening members disposed in said flange attachment holes of said center spacer member and said second and third adaptor rings for securing said second and third adaptor rings to said center spacer member.

14. A flexible coupling as defined in claim 13, further comprising:
said plurality of countersunk bosses being provided alternatingly in said plurality of said flexible element attachment holes of said first, second, third and fourth adaptor rings for receipt of said flexible element fastening members and each countersunk boss having an enlarged end and a reduced end, said enlarged ends of said countersunk bosses allowing said enlarged portions of said flexible element fastening members to be received therein such that an outer edge of said enlarged portions are spaced inwardly from said countersunk guide face of said first, second, third, and fourth adaptor rings, respectively.

15. A flexible coupling as defined in claim 14, wherein said first and second flexible elements each comprise a plurality of thin discs in a side-by-side relationship, each said disc defining said plurality of bores in said first and second flexible elements, said plurality of bores corresponding to said plurality of flexible element attachment holes of said first, second, third, and fourth adaptor rings, and wherein at least certain of said flexible element fastening means retain said plurality of thin discs in said side-by-side relationship.

16. A flexible coupling as defined in claim 15, wherein a countersunk boss on one adaptor ring is located opposite a flexible element attachment hole on an opposite adaptor ring.

17. A flexible coupling as defined in claim 11, further comprising:
an elongated, generally cylindrical extension portion provided on said first coupling hub and extending at least through said central bore of said first adaptor ring, said first flexible element, and into said central bore of said second adaptor ring; and
an elongated, generally cylindrical extension portion provided on said second coupling hub and extending at least through said central bore of said fourth adaptor ring, said second flexible element, and into said central bore of said third adaptor ring.

18. A flexible coupling for connecting a driving shaft and a driven shaft together in an end-to-end relationship for transmitting power from the driving shaft to the driven shaft, the flexible coupling comprising:
a first coupling hub having a first generally cylindrical body portion with a central bore for mounting on one of the shafts, said first coupling hub including a first annular flange projecting radially outwardly therefrom, said first annular flange defining a plurality of flange attachment holes;
a second coupling hub having a second generally cylindrical body portion with a central bore for mounting on the other of the shafts, said second coupling hub including a second annular flange projecting radially outwardly therefrom, said second annular flange defining a plurality of flange attachment holes;
a center spacer member having a generally cylindrical body portion, said center spacer having two ends, each end having an annular flange projecting radially outwardly therefrom, each said annular flange defining a plurality of flange attachment holes;
a first adaptor ring and a fourth adaptor ring, each having an annular body with a central bore therethrough, each said first adaptor ring and said fourth adaptor ring including an annular body having on one side thereof a substantially radially extending first face and on the other side thereof a substantially radially extending second face, said first face of said first adaptor ring being for mounting to said first annular flange of said first coupling hub and said first face of said fourth adaptor ring being for mounting to said second annular flange of said second coupling hub;
a second adaptor ring and a third adaptor ring, each having an annular body with a central bore therethrough, said second adaptor ring and said third adaptor ring each including an annular body having on one side thereof a substantially radially extending first face and on the other side thereof a substantially radially extending second face, each said first face being for mounting to one of said annular flanges of said center spacer member;
a first flexible element member disposed between said first adaptor ring and said second adaptor ring, and a second flexible element member disposed between said fourth adaptor ring and said third adaptor ring, said first and second flexible element members being for transmitting rotational forces from the driving shaft to the driven shaft and each defining a plurality of bores therein, said first flexible element member being adjacent both said second faces of said first and second adaptor rings, said second flexible element member being adjacent both said second faces of said third and fourth adaptor rings;
each of said adaptor rings defining a plurality of alternating flange attachment holes and flexible element attachment holes extending therethrough, said plurality of flange attachment holes corresponding to said plurality of flange attachment holes of an adjacent flange
a plurality of flexible element fastening members having transversely extending enlarged portions at an end of same and disposed in said flexible element attachment holes of said first adaptor ring and said second adaptor ring for securing said first flexible element member therebetween, said plurality of flexible element fastening members being disposed in said flexible element attachment holes of said fourth adaptor ring and said third adaptor ring for securing said second flexible element member therebetween, said flexible element attachment holes being larger in diameter dimension than the transverse dimension of said enlarged portions of said flexible element fastening members;
a plurality of flange attachment fastening members disposed in said flange attachment holes of said first coupling hub and said first adaptor ring mounted thereon for securing said first adaptor ring to said first coupling hub, a plurality of flange attachment fastening members disposed in said flange attachment holes of said second coupling hub and said fourth adaptor ring mounted thereon for securing said foruth adaptor ring to said second coupling hub, and a plurality of flange attachment fastening members disposed in said flange attachment holes of said center spacer member and said second and third adaptor rings for securing said second and third adaptor rings to said center spacer member; and a plurality of bosses provided in said first, second, third, and fourth adaptor rings, each of said bosses defining a recess for receipt of said flexible element fastening members, said bosses extending outwardly from said second face of said first, second, third and fourth adaptor rings.

19. The flexible coupling as defined in claim 18, wherein:

said plurality of bosses are countersunk and are provided alternatingly in said plurality of said flexible element attachment holes of said first, second, third, and fourth adaptor rings for receipt in said flexible element fastening members and wherein each said countersunk boss has an enlarged end and a reduced end, said enlarged end of said countersunk bosses allowing an outer edge of said enlarged portions of said flexible fastening members to be received therein such that said enlarged portions are spaced inwardly from said first faces of said first, second, third, and fourth adaptor rings, respectively.

20. The flexible coupling as defined in claim 19, wherein said first and second flexible element members each comprise a plurality of thin discs in a side-by-side relationship, each said disc defining said plurality of bores in said first and second flexible element members, said bores corresponding to said plurality of said flexible element attachment holes in said first, second, third, and fourth adaptor rings, and wherein at least certain of said flexible element fastening members retain said plurality of said thin discs in said side-by-side relationship.

21. The flexible coupling as defined in claim 18, wherein a boss in one adaptor ring is located opposite a flexible element attachment hole in an opposite adaptor ring.

22. The flexible coupling as defined in claim 18, further comprising:

said first annular flange of said first coupling hub and said second annular flange of said second coupling hub defining therein flexible element fastening member clearance holes alternatingly with said flange attachment holes for providing clearance for said flexible element fastening members; and said annular flanges of said center spacer member defining therein flexible element fastening member clearance holes alternatingly with said center spacer member attachment holes for providing clearance for said flexible element fastening members.

23. A flexible coupling as defined in claim 18, wherein said substantially radially extending first face of said first, second, third, and fourth adaptor rings defines a countersunk contour.

24. A flexible coupling as defined in claim 18, further comprising:

an elongated, generally cylindrical portion provided on said first generally cylindrical body portion of said first coupling hub and extending at least through said central bore of said first adaptor ring, said first flexible element means, and into said central bore of said second adaptor ring; and an elongated, generally cylindrical extension portion provided on said second generally cylindrical body portion of said second coupling hub and extending at least through said central bore of said fourth adaptor ring, said second flexible element means, and into said central bore of said third adaptor ring.

25. A flexible coupling for connecting an annular flange of a driving shaft and an annular flange of a driven shaft together in an end-to-end relationship for transmitting power from the driving shaft to the driven shaft, each of the annular flanges defining a plurality of flange attachment holes, the flexible coupling comprising:

a first adaptor ring and a second adaptor ring, each having an annular body portion with a central bore therethrough, said annular body portion of said first and said second adaptor rings each defining on one side thereof a substantially radially extending guide face adapted to receive an annular flange connected to one of each of said shafts and on an opposite side thereof a substantially radially extending, generally planar face;

a flexible element disposed between and secured to said first adaptor ring and said second adaptor ring, said flexible element defining a plurality of bores therethrough; said flexible element transmitting rotational forces from the driving shaft to the driven shaft, and said flexible element being adjacent said generally planar face of said first adaptor ring and said generally planar face of said second adaptor ring;

said first and second adaptor rings defining therein a plurality of flange attachment holes and a plurality of flexible element attachment holes alternatingly with respect to one another therein, said plurality of flange attachment holes of said first adaptor ring corresponding to said plurality of flange attachment holes of said annular flange of said first coupling hub and said plurality of flange attachment holes of said second adaptor ring corresponding to said plurality of flange attachment holes of said annular flange of said second coupling hub, said flexible element attachment holes corresponding to said bores of said flexible element;

a plurality of flexible element fastening members having transversely extending enlarged portions at one end thereof and being received in said flexible element attachment holes of both of said first and second adaptor rings for securing said flexible element means therebetween, said flexible element attachment holes being larger in diameter than the transverse dimension of said enlarged portions of said flexible element fastening members and each adjacent flexible element fastening member having its enlarged portion at an opposite adaptor ring;

a plurality of flange attachment members disposed in said flange attachment holes of said first coupling hub and said first adaptor ring mounted thereon for securing said first adaptor ring to said first coupling hub, and a plurality of flange attachment members disposed in said flange attachment holes of said second coupling hub and said second adaptor ring mounted thereon for securing said second adaptor ring to said second coupling hub;

a plurality of countersunk bosses provided alternatingly in said plurality of flexible element attachment holes of said first and second adaptor rings for receipt of said flexible element fastening members, said countersunk bosses extending outwardly from said generally planar face of each of said first and second adaptor rings for allowing said enlarged portions of said flexible element fastening members to be received therein such that an outer edge of said enlarged portions are recessed inwardly from said guide face of said first and second adaptor rings, respectively;

a plurality of flexible element bushings, one of which being mounted in each of said bores of said flexible element, each of said flexible element bushings having an enlarged end and a reduced end; and a recess defined in each said countersunk boss for receipt of one said reduced end of said flexible element bushings.

* * * * *